United States Patent
Zhao (10) Patent No.: US 9,499,410 B2
(45) Date of Patent: Nov. 22, 2016

(54) METHODS AND COMPOSITIONS FOR MAKING METAL OXIDE-GRAPHENE COMPOSITES

(71) Applicant: East China University of Science and Technology, Shanghai (CN)

(72) Inventor: Chongjun Zhao, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 14/431,018

(22) PCT Filed: Sep. 29, 2012

(86) PCT No.: PCT/CN2012/082464
§ 371 (c)(1),
(2) Date: Mar. 25, 2015

(87) PCT Pub. No.: WO2014/047930
PCT Pub. Date: Apr. 3, 2014

(65) Prior Publication Data
US 2015/0251919 A1  Sep. 10, 2015

(51) Int. Cl.
*C01D 15/02* (2006.01)
*C01B 31/04* (2006.01)
(Continued)

(52) U.S. Cl.
CPC .......... *C01D 15/02* (2013.01); *B82Y 30/00* (2013.01); *B82Y 40/00* (2013.01); *C01B 31/043* (2013.01); *C01B 31/0446* (2013.01); *C01B 31/0476* (2013.01); *H01G 11/46* (2013.01);
(Continued)

(58) Field of Classification Search
CPC ...... C01D 15/02; H01G 11/46; B82Y 40/00;
B82Y 30/00; C01B 31/0446; C01B 31/043;
C01B 31/0476; H01M 4/587; H01M 4/485;
H01M 4/364; Y02E 60/122
See application file for complete search history.

(56) References Cited

U.S. PATENT DOCUMENTS

| 8,611,070 B2 | 12/2013 | Ivanovici et al. |
| 2011/0256014 A1* | 10/2011 | Hong .............. C22C 1/0425 419/11 |
| 2012/0021224 A1 | 1/2012 | Everett et al. |
| 2012/0205606 A1 | 8/2012 | Lee et al. |

FOREIGN PATENT DOCUMENTS

| CN | 101993064 A  *  3/2011 |
| CN | 102208639 A    10/2011 |

(Continued)

OTHER PUBLICATIONS

Jintao Zhang et al. "Graphene-metal-oxide composites for the degradation of dys under visible light irradiation" J. Mater. Chem., 2011 21, 3634.*

(Continued)

*Primary Examiner* — Peter F Godenschwager
*Assistant Examiner* — Andrew J Oyer
(74) *Attorney, Agent, or Firm* — Dorsey & Whitney LLP (57) ABSTRACT

Methods of making a metal oxide-graphene composite are disclosed. The method can include, for example, providing a composition including graphene oxide and at least one elemental metal dispersed in a liquid medium, and heating the composition in a sealed chamber at a temperature above a nominal boiling point of the liquid medium to form the metal oxide-graphene composite. Compositions useful for performing the process and composites obtained by the process are also disclosed.

21 Claims, 10 Drawing Sheets

(51) Int. Cl.
*H01M 4/36* (2006.01)
*H01M 4/485* (2010.01)
*H01M 4/587* (2010.01)
*B82Y 30/00* (2011.01)
*B82Y 40/00* (2011.01)
*H01G 11/46* (2013.01)

(52) U.S. Cl.
CPC .......... *H01M 4/364* (2013.01); *H01M 4/485* (2013.01); *H01M 4/587* (2013.01); *Y02E 60/122* (2013.01); *Y02P 70/54* (2015.11)

(56) References Cited

FOREIGN PATENT DOCUMENTS

| | | |
|---|---|---|
| CN | 102315433 A | 1/2012 |
| CN | 102329976 A | 1/2012 |
| CN | 102500755 A | 6/2012 |
| CN | 102646817 A | 8/2012 |
| TW | 201206712 A | 2/2012 |
| WO | 2012047372 A1 | 4/2012 |

OTHER PUBLICATIONS

English Translation of CN 101993064.*
Fan, Z., "An environmentally friendly and efficient route for the reduction of graphene oxide by aluminum powder," Carbon, vol. 48, Issue 5, pp. 1686-1689 (Apr. 2010).
International Search Report and Written Opinion for International Application No. PCT/CN2012/082464, mailed on Jul. 11, 2013.
Lake, J. R., et al., "Graphene metal oxide composite supercapacitor electrodes," J. Vac. Sci. Technol. B, vol. 30, Issue 3, pp. 03D118-1-03D118-6 (2012).
Lu, T., et al., "Electrochemical behaviors of graphene—ZnO and graphene—SnO2 composite films for supercapacitors," Electrochimica Acta, vol. 55, Issue 13, pp. 4170-4173 (May 1, 2010).
Song, W., et al., "Graphene Decorated with ZnO Nanocrystals with Improved Electrochemical Properties Prepared by a Facile in Situ Hydrothermal Route," International Journal of Electrochemical Science, vol. 7, pp. 2164-2174 (Mar. 1, 2012).
Zhu, J., et al., "Facile synthesis of metal oxide/reduced graphene oxide hybrids with high lithium storage capacity and stable cyclability," Nanoscale, vol. 3, Issue 3, pp. 1084-1089 (Mar. 22, 2011).
Fan, Z-J., et al., "Facile Synthesis of Graphene Nanosheets via Fe Reduction of Exfoliated Graphite Oxide," ACS Nano, vol. 5, No. 1, pp. 191-198 (2011).
International Search Report and Written Opinion for International Application No. PCT/CN2013/072182 mailed Dec. 12, 2013.
Sarkar, S., and Basak, D., "The reduction of graphene oxide by zinc powder to produce a zinc oxide-reduced graphene oxide hybrid and its superior photocatalytic activity," Chemical Physics Letters, vol. 561-562, pp. 125-130 (Mar. 13, 2013).
Zhao, Y., et al., "A facile route to the synthesis copper oxide/reduced graphene oxide nanocomposites and electrochemical detection of catechol organic pollutant," Cryst Eng Comm, vol. 14, Issue 20, pp. 6710-6719 (Jun. 21, 2012).

* cited by examiner

METHODS AND COMPOSITIONS FOR MAKING METAL OXIDE-GRAPHENE COMPOSITES

This application is the U.S. National Phase under 35 U.S.C. §371 of International Application No. PCT/CN2012/082464, filed Sep. 29, 2012, which is hereby incorporated by reference in its entirety.

BACKGROUND

With the continuous decrease of fossil energy, mankind may be facing a serious energy shortage. On the other hand, the pollution caused by urbanization and industrialization progression also becomes increasingly severe; therefore energy sources and environmental protection have become two important social problems that mankind currently faces. Clean energy sources such as solar energy and wind energy are effective ways to address the two problems as described above. Energy storage devices play an important role in solving the difference between day and night of solar energy and the seasonality of wind energy. Batteries, particularly lithium-ion batteries, and supercapacitors are two important types of energy storage devices. The applications of both lithium-ion batteries and supercapacitors are dependent on their performance. As the core of the devices, the performance of the electrode material is critical for the impact on their performance, and often directly determines the performance of the devices.

SUMMARY

Some embodiments disclosed here include a method of making a metal oxide-graphene composite, the method can include: providing a composition including graphene oxide and at least one elemental metal dispersed in a liquid medium; and heating the composition in a sealed chamber at a temperature above a nominal boiling point of the liquid medium to form the metal oxide-graphene composite.

Some embodiments disclosed herein include a composition for making a metal oxide-graphene composite, the composition can include: at least one elemental metal; graphene oxide; and a liquid medium, wherein the elemental metal and the graphene oxide are dispersed in the liquid medium.

Some embodiments disclosed herein include a metal oxide-graphene composite obtained by a method including: providing a composition comprising graphene oxide and at least one elemental metal dispersed in a liquid medium; heating the composition in a sealed chamber at a temperature above the nominal boiling point of the liquid medium to form the metal oxide-graphene composite; and isolating the metal oxide-graphene composite from the liquid medium.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Some embodiments disclosed herein include a method of making a metal oxide-graphene composite. The method can include, in some embodiments, providing a composition and heating the composition in a sealed chamber. The composition may include graphene oxide and at least one elemental metal dispersed in a liquid medium. In some embodiments, the composition can be heated at a temperature above a nominal boiling point of the liquid medium.

Figure 1:
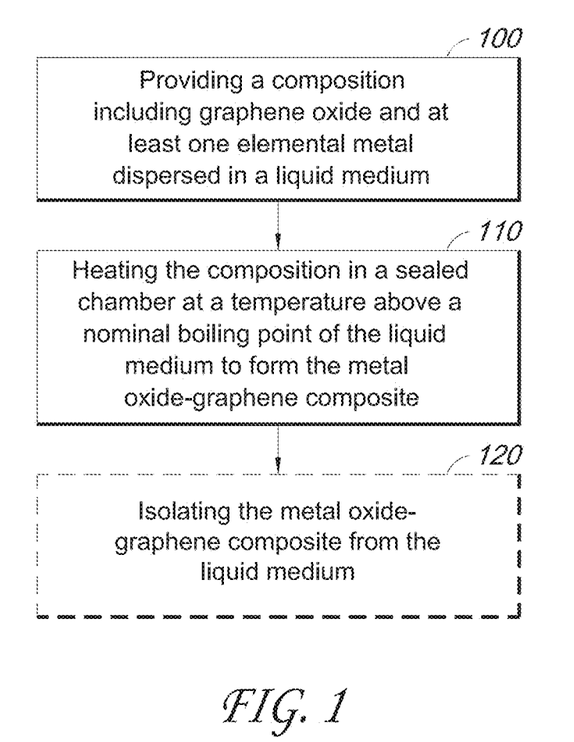
FIG. 1 is a flow diagram showing one example of a method of making a metal oxide-graphene composite that is within the scope of the present application.

FIG. 1 is a flow diagram showing one example of the methods of making a metal oxide-graphene composite. The method of making the composition can include: "Providing a composition including graphene oxide and at least one elemental metal dispersed in a liquid medium", as illustrated in block 100; "Heating the composition in a sealed chamber at a temperature above a nominal boiling point of the liquid medium to form the metal oxide-graphene composite", as illustrated in block 110; and "Isolating the metal oxide-graphene composite from the liquid medium", as illustrated in block 120. Although FIG. 1 depicts the operations as being performed consecutively, one or more operations may be performed at about the same time.

At operation 100 "Providing a composition including graphene oxide and at least one elemental metal dispersed in a liquid medium", a suitable composition is obtained for processing into a composite. The composition can include at least one elemental metal (e.g., one, two, three, or more elemental metals) dispersed within the liquid medium. In some embodiments, the composition includes only one elemental metal. Non-limiting examples of suitable elemental metals include Ni, Mn, Fe, Zn, Sn, Cu, and Co. In some embodiments, the elemental metal is not aluminum.

The amount of elemental metals dispersed within the liquid medium is not particularly limited. The amount of elemental metals dispersed within the liquid medium can be, for example, at least about 0.01 mg/mL; at least about 0.1 mg/mL; at least about 0.5 mg/mL; or at least about 1 mg/mL. The amount of elemental metals dispersed within the liquid medium can be, for example, less than or equal to about 10 mg/mL; less than or equal to about 5 mg/mL; or less than or equal to about 3 mg/mL. In some embodiments, the amount of elemental metals dispersed within the liquid medium can be about 0.01 mg/mL to about 10 mg/mL or about 0.5 mg/mL to about 5 mg/mL.

The elemental metals can, for example, be in a granular form dispersed within the liquid medium. For example, zinc powder may be dispersed within the liquid medium. The granular form can have an average particle size of, for example, less than or equal to about 100 μm; less than or equal to about 10 μm; less than or equal to about 1 μm; less than or equal to about 500 nm; or less than or equal to about 100 μm. The elemental metal may be comminuted into granular form using standard procedures, such as crushing, grinding, ball milling, and the like.

The composition can also include graphene oxide dispersed within the liquid medium. Various methods of obtaining graphene oxide are known in the art, and the present application is not limited to graphene oxide obtained by any particular process. As an example, the graphene oxide may be obtained by Hummers or modified Hummers process. The graphene oxide may, for example, have a carbon to oxygen ratio of about 4:1 to about 2:1.

The amount of graphene oxide dispersed within the liquid medium is not particularly limited. The amount of graphene oxide dispersed within the liquid medium can be, for example, at least about 0.005 mg/mL; at least about 0.01 mg/mL; at least about 0.05 mg/mL; or at least about 0.1 mg/mL. The amount of graphene oxide dispersed within the liquid medium can be, for example, less than or equal to about 10 less than or equal to about 5 mg/mL; less than or equal to about 1 mg/mL; or less than or equal to about 0.7 mg/mL. In some embodiments, the amount of graphene oxide dispersed within the liquid medium can be about 0.005 mg/mL to about 10 mg/mL, or about 0.1 mg/mL to about 1 mg/mL.

The relative amount of elemental metals to graphene oxide may also be varied, for example, to adjust the composition of the resulting metal oxide-graphene composite. The relative amount of elemental metals to graphene oxide by weight can be, for example, at least about 1:10; at least about 1:5; at least about 1:3; at least about 1:1; or at least about 3:1. The relative amount of elemental metals to graphene oxide by weight can be, for example, less than or equal to about 10:1; less than or equal to about 5:1; less than or equal to about 3:1; less than or equal to about 1:1; or less or equal to about 1:3. In some embodiments, the relative amount of elemental metals to graphene oxide by weight is about 1:10 to about 10:1, or about 1:3 to about 3:1.

The liquid medium in the composition can be various liquids. The liquid medium can be, for example, any inert liquid in which the elemental metal and graphene oxide can be dispersed. The liquid medium may also be selected such that it is readily separated from the composite after performing the method. In some embodiments, the liquid medium includes a protic solvent. Non-limiting examples of suitable solvents include water and alcohols, such as methanol, ethanol, and isopropanol. In some embodiments, the liquid medium includes water and an organic solvent. In some embodiments, the liquid medium includes water and an alcohol. In some embodiments, the liquid medium includes water and $C_{1-8}$ alkanol. As used herein, "$C_{1-8}$ alkanol" refers to a linear, branched, or cyclic alcohol such as methanol, ethanol, isopropanol, cyclohexanol, and octanol.

The amount of protic solvent in the liquid medium by volume can be, for example, at least about 20%; at least about 40%; at least about 60%; at least about 80%; at least about 90%; or at least about 95%. In some embodiments, the liquid medium includes less than 5% by volume of aprotic solvent, or is substantially free of aprotic solvent.

The amount of water in the liquid medium by volume can be, for example, at least about 20%; at least about 40%; at least about 60%; at least about 80%; at least about 90%; or at least about 95%. In some embodiments, the liquid medium includes less than 5% by volume of water, or is substantially free of water.

The amount of organic solvent in the liquid medium by volume can be, for example, at least about 20%; at least about 40%; at least about 60%; at least about 80%; at least about 90%; or at least about 95%. In some embodiments, the liquid medium includes less than 5% by volume of organic solvent, or is substantially free of organic solvent.

The amount of $C_{1-8}$ alkanol in the liquid medium by volume can be, for example, at least about 20%; at least about 40%; at least about 60%; at least about 80%; at least about 90%; or at least about 95%. In some embodiments, the liquid medium includes less than 5% by volume of $C_{1-8}$ alkanol, or is substantially free of $C_{1-8}$ alkanol.

The amount of ethanol in the liquid medium by volume can be, for example, at least about 20%; at least about 40%; at least about 60%; at least about 80%; at least about 90%; or at least about 95%. In some embodiments, the liquid medium includes less than 5% by volume of ethanol, or is substantially free of ethanol.

The elemental metals and graphene oxide can be dispersed in the liquid medium using standard techniques, such as sonication, high-shear mixing, magnetic stir bar, and the like. The present application is therefore not limited to any particular method of dispersing the elemental metals and graphene oxide. Furthermore, the element metals and graphene oxide can be sequentially dispersed in the liquid medium, or dispersed at about the same time. The elemental metals and graphene oxide may also be separately dispersed in different liquid mediums (having the same or different solvents) which are subsequently intermixed to obtain the composition. In some embodiments, the composition is a suspension. In some embodiments, the composition is a generally homogenous mixture.

Various other optional additives may be included in the composition, such as dispersants, surfactants, anti-foaming agents, and the like. The amount of optional additives in the compositions can be, for example, less than or equal to about 0.05 mg/mL; less than or equal to about 0.01 mg/mL; or less than or equal to about 0.001 mg/mL. In some embodiments, the amount of optional additives in the composition is 0.0001 mg/mL to about 0.05 mg/mL. In some embodiments, the composition is substantially free of optional additives.

The composition may, for example, include low amounts of metal salts or is substantially free of metal salts. The composition can include, for example, no more than about 0.1 mg/mL of metal salts, or no more than about 0.01 mg/mL of metal salts. In some embodiments, the composition is substantially free of metal salts. By including low amounts of metal salts, in some embodiments, the methods disclosed herein may provide an efficient process with low amounts of byproducts (or free of byproducts) and/or diminished environmental impact.

The composition may, for example, include low amounts of metal salts or is substantially free of metal salts, where the metal salts are one or more salts of Ni, Mn, Fe, Zn, Sn, Cu, and Co. The composition can include, for example, no more than about 0.1 mg/mL of these metal salts, or no more than about 0.01 mg/mL of these metal salts. In some embodiments, the composition is substantially free of these metal salts.

In some embodiments, the composition includes low amounts of organometallic salts or is substantially free of organometallic salts. For example, the composition can be substantially free of copper acetate, iron acetylacetonate, zinc acetate, and/or tin acetate. The composition can include, for example, no more than about 0.1 mg/L of organometallic salts, or no more than about 0.01 mg/mL of organometallic salts.

In some embodiments, the composition includes low amounts of organometallic salts or is substantially free of organometallic salts, where the organometallic salts are one or more salts of Ni, Mn, Fe, Zn, Sn, Cu, and Co. The composition can include, for example, no more than about 0.1 mg/mL of these organometallic salts, or no more than about 0.01 mg/mL of these organometallic salts.

In some embodiments, the composition includes low amounts of halide salts or is substantially free of halide salts. For example, the composition can be substantially free of $NiCl_2$, $FeCl_3$, and/or $TiCl_3$. The composition can include, for example, no more than about 0.1 mg/mL of halide salts, or no more than about 0.01 mg/mL of halide salts.

The composition may, in some embodiments, be substantially free of reducing agents. As used herein, a "reducing agent" refers to non-elemental metals that can donate an election in a reduction-oxidation with graphene oxide during the method of making the metal oxide-graphene composite. Non-limiting examples of reducing agents include hydrazine, 1,1-dimethylhydrazine, 1,2-dimethylhydrazine, 1,1-diethylhydrazine, 1,2-diethylhydrazine, 1-ethyl-2-methylhydrazine, 1-acetyl-2-methythydrazine, 1,1-diethyl-2-propylhydrazine, hydrazine sulfate, sulfonated hydrazine derivatives, lithium borohydride, sodium borohydride, potassium borohydride, rubidium borohydride, cesium borohydride, lithium cyano borohydride sodium cyano borohydride, potassium cyano borohydride, rubidium cyano borohydride, cesium cyano borohydride, ammonium borohydride, tetramethylammonium borohydride, dimethylamino borane, N,N-diethylaniline borane, and pyridine borane.

In some embodiments, the composition is substantially free of an organic reducing agent. In some embodiments, the composition is substantially free of non-metal reducing agents (e.g., hydrazine). In some embodiments, the composition is substantially free of hydrazine, 1,1-dimethylhydrazine, 1,2-dimethylhydrazine, 1,1-diethylhydrazine, 1,2-diethylhydrazine, 1-ethyl-2-methylhydrazine, 1-acetyl-2-methylhydrazine, 1,1-diethyl-2-propylhydrazine, hydrazine sulfate, and sulfonated hydrazine derivatives.

At operation 110 "Heating the composition in a sealed chamber at a temperature above a nominal boiling point of the liquid medium to form the metal oxide-graphene composite", the composition is heated under suitable conditions to obtain the composite. Generally, the process may include heating the composition above the nominal boiling point to obtain high temperature and high pressure (e.g., more than about 1 atm facilitate forming the composite.

As used herein, the "nominal boiling point" refers to the temperature at which the liquid medium exhibits a phase change to a gas at 1 atm pressure. For example, the nominal boiling point of water is 100° C.

The composition may be heated in the sealed chamber at a temperature that is effective to form the composite. The composition can be heated in the sealed chamber at a temperature of, for example, at least about 100° C.; at least about 125° C.; at least about 150° C.; at least about 200° C.; at least about 250° C.; or at least about 300° C. The composition can be heated in the sealed chamber at a temperature of, for example, less than or equal to about 500° C.; less than or equal to about 400° C.; less than or equal to about 300° C.; or less than or equal to about 200° C. In some embodiments, the composition can be heated in the sealed chamber at a temperature of about 100° C. to about 500° C., or about 125° C. to about 300° C.

The composition may also be heated for a time period that is effective to form the composite. The composition can be heated for a time period of, for example, at least about 30 minutes; at least about 1 hour; at least about 4 hours; at least about 12 hours; or at least about 24 hours. The composition can be heated for a time period of, for example, less than or equal to about 100 hours; less than or equal to about 48 hours; less than or equal to about 24 hours; or less than or equal to about 12 hours. In some embodiments, the composition can be heated for a time period of about 30 minutes to about 100 hours, or about 4 hours to about: 24 hours.

Heating the composition in the sealed chamber can also produce an increased pressure. The pressure in the sealed chamber while heating the composition may reach, for example, more than 1 atm; at least about 1.2 atm; at least about 1.5 atm; or at least about 2 atm.

The sealed chamber is not particularly limited and may generally be any inert container that withstands the temperatures and pressures applied during the process. As a non-limiting example, the sealed chamber may be an autoclave that is heated in a furnace or oven. The volume of the sealed chamber filled with the composition may also vary. For example, the sealed chamber may be half-filled with the composition. The amount of the composition in the sealed chamber by volume relative to a total volume of the sealed chamber may be, for example, at least about 10%; at least about 20%; at least about 40%; at least about 50%; or at least about 60%.

Heating the composition under appropriate conditions can yield a metal oxide-graphene composite. Without being bound to any, particular theory, it is believed the elemental metals and graphene oxide complete a reduction-oxidation reaction to obtain the composite. Thus, at least a portion of the graphene in the composite may be reduced graphene oxide. The metal oxide within the composite may vary depending on the elemental metals used in the composition. Non-limiting examples of metal oxides that may be included in the composite are nickel oxide (e.g., $NiO$ or $Ni_2O_3$), magnesium oxide, iron oxide (e.g., $FeO$, $Fe_2O_3$, or $Fe_3O_4$), zinc oxide, tin oxide, copper oxide (e.g., $Cu_2O$ or CuO) and cobalt oxide (e.g., CoO, $Co_2O_3$, or $Co_3O_4$).

The relative amount of metal oxides to graphene in the composite may be varied, for example, by adjusting the relative amount of elemental metals and graphene oxide in the composition. The relative amount of metal oxides to graphene by weight can be, for example, at least about 1:10; at least about 1:5; at least about 1:3; at least about 1:1; or at least about 3:1. The relative amount of metal oxides to graphene by weight can be, for example, less than or equal to about 10:1; less than or equal to about 5:1; less than or equal to about 3:1; less than or equal to about 1:1; or less or equal to about 1:3. In some embodiments, the relative amount of metal oxides to graphene by weight is about 1:10 to about 10:1, or about 1:3 to about 3:1.

The composite may, in some embodiments, include a crystalline or semi-crystalline metal oxide. In some embodiments, the metal oxide has a degree of crystallinity of at least about 50%, or at least about 75%.

Figure 3:
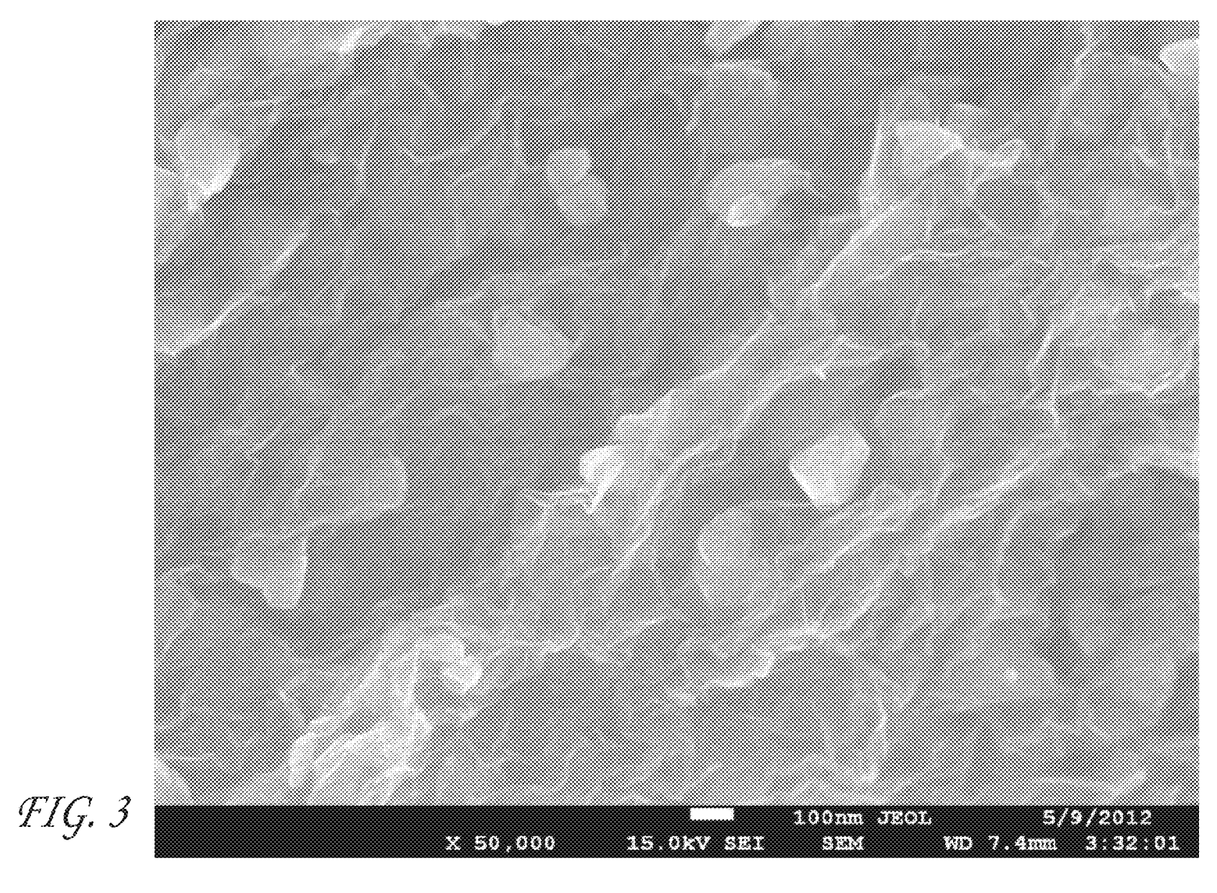
FIG. 3 shows a scanning electron microscopy image of the ZnO-graphene composite prepared according to Example 1.

The composite may, in some embodiments, include graphene wrapping the metal oxide. An example of graphene wrapping the metal oxide is shown in FIG. 3 which has a ZnO-graphene composite prepared according to Example 1 below. In some embodiments, the composite preferentially includes graphene wrapping the metal oxide relative to a graphene having metal oxide covering the surface of the grapheme. For an example of composites having metal oxide covering the surface of graphene see Electochimica Acta, Vol. 55, (2010), pp. 4170-73.

At operation 120 "Isolating the metal oxide-graphene composite from the liquid medium", the formed composite can be isolated. Operation 120 is optional, and therefore some embodiments of the method do not include isolating the composite. The present application is not limited to any particular technique for isolating the composite. Non-limiting examples of suitable techniques include filtration, centrifugation, and sedimentation. Two or more isolation techniques may be optionally combined. Generally, a solid form of the composite may be isolated.

Some embodiments disclosed herein include a composition for forming a metal oxide-graphene composite. The composition can be any of the compositions disclosed in the present application that can be heated in a sealed chamber to obtain the composite. For example, the composition can include at least one elemental metal and graphene oxide dispersed in a liquid medium. The liquid medium may, for example, be water or ethanol.

Some embodiments disclosed herein include a metal oxide-graphene composite. The composite may, in some embodiments, be obtained by any of the processes disclosed in the present application. For example, the composite may preferentially include graphene wrapping the metal oxide relative to graphene having metal oxide covering the surface of the graphene.

With respect to the use of substantially any plural and/or singular terms herein, those having skill in the art can translate from the plural to the singular and/or from the singular to volume of wastewater can be received in the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the hare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

EXAMPLES

Additional embodiments are disclosed in further detail in the following examples, which are not in any way intended to limit the scope of the claims.

Example 1

6 mL of graphene oxide in deionized water (5 mg/mL) was added to 44 mL of deionized water and then 64 mg of zinc powder was added into the solution. The solution became dark after stirring. The solution was transferred to an autoclave having a volume of 100 mL, and then the autoclave was placed in an oven and heated at 150° C. for about 24 hours. After cooling, the black/white (black—RGO, white—ZnO) solid material at the bottom of the autoclave was removed and washed clean to obtain a ZnO-graphene composite.

Figure 2:
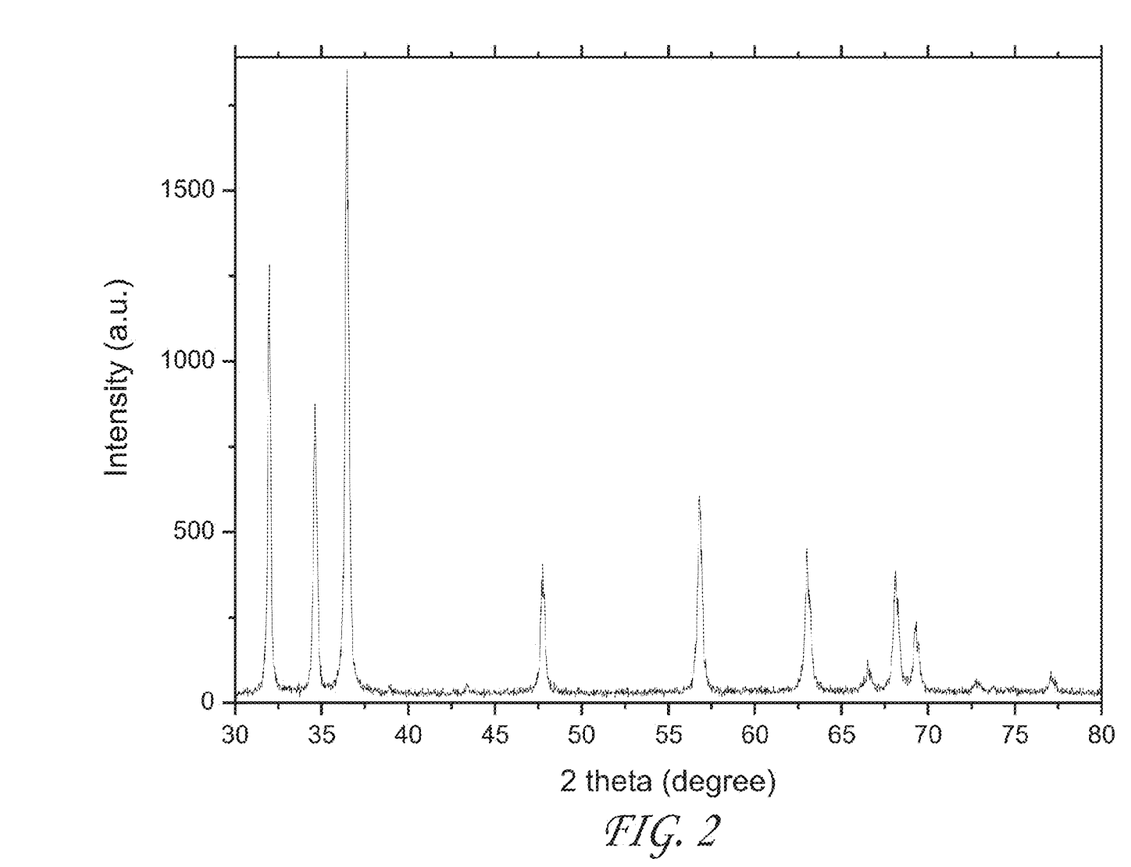
FIG. 2 shows an X-ray diffraction pattern obtained for the ZnO-graphene composite prepared according to Example 1.

ZnO-graphene powder was dispersed on a quartz surface to form a thin film. The film was then analyzed by X-ray diffraction using copper Kα radiation. The powder X-ray diffraction pattern is shown in FIG. 2. These results demonstrate that crystalline ZnO was obtained by the process.

The ZnO-graphene powder was dispersed in ethanol ultrasonically, and then placed on a Si substrate. The ethanol was evaporated the composite was inspected by scanning electron microscopy (SEM). FIG. 3 shows one SEM image obtained from the sample.

Figure 4:
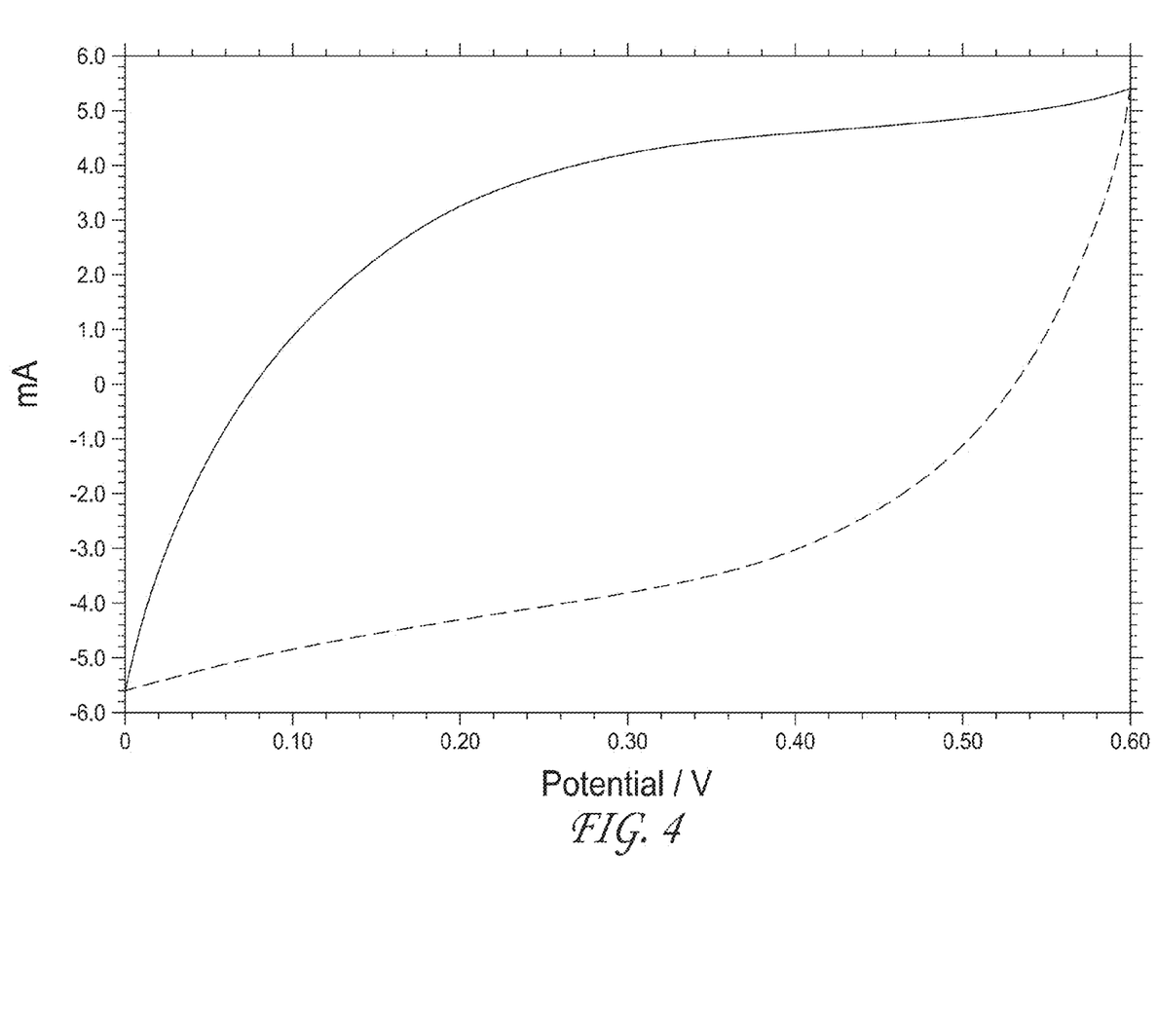
FIG. 4 shows the current-voltage profile (or cyclic voltammogram) for the ZnO-graphene composite prepared according to Example 1.

The ZnO-graphene composite, carbon black and Polyvinylidene fluoride (PVDF) powder (8:1:1) were well ground, and then mixed N-methylpyrrolidone (NMP). Next, the slurry was coated on metal current collectors to form films. After drying, the films were used as working electrode to test their Current-Voltage performance in a 3-electrode system. The results are shown in FIG. 4 and demonstrate favorable capacitance properties.

In summary, this example demonstrates an efficient, one-pot reaction for forming a ZnO-graphene composite with favorable capacitance properties. The process also does not require environmentally hazardous materials.

Example 2

Figure 5:
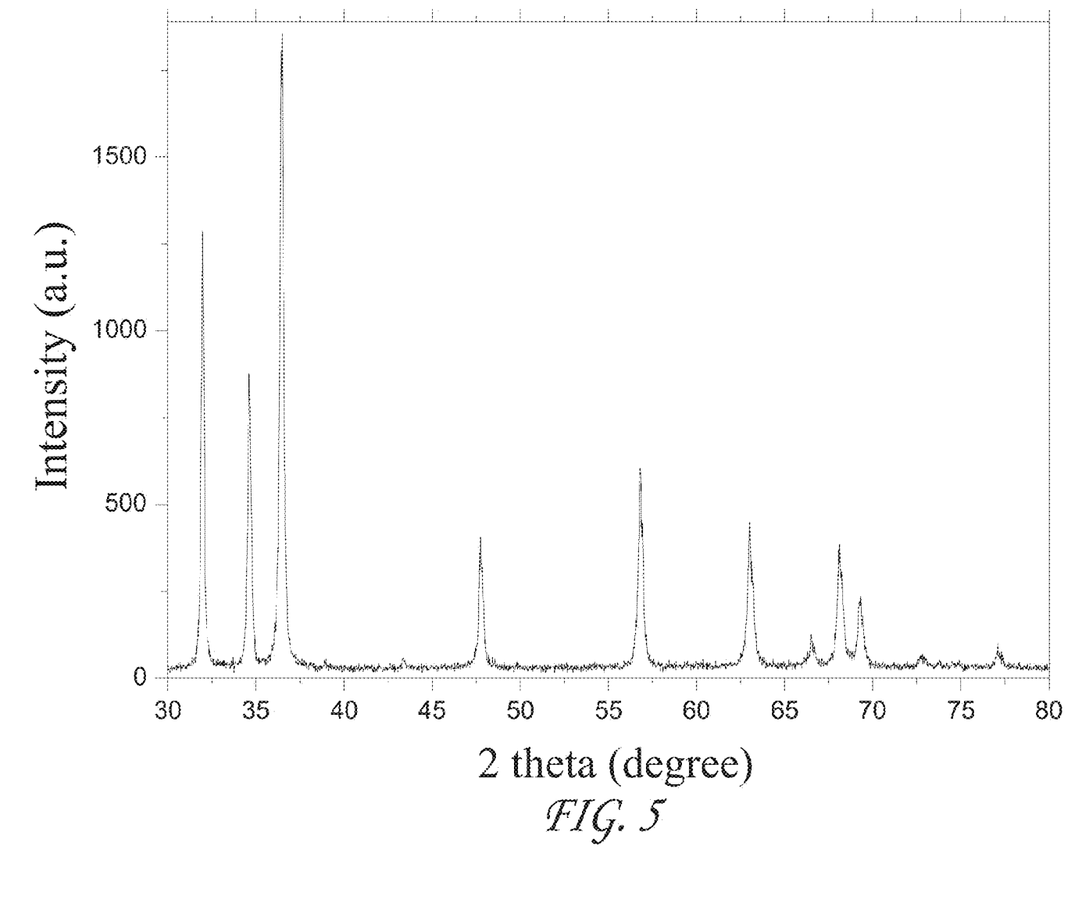
FIG. 5 shows an X-ray diffraction pattern obtained for the ZnO-graphene composite prepared according to Example 2.
Figure 6:
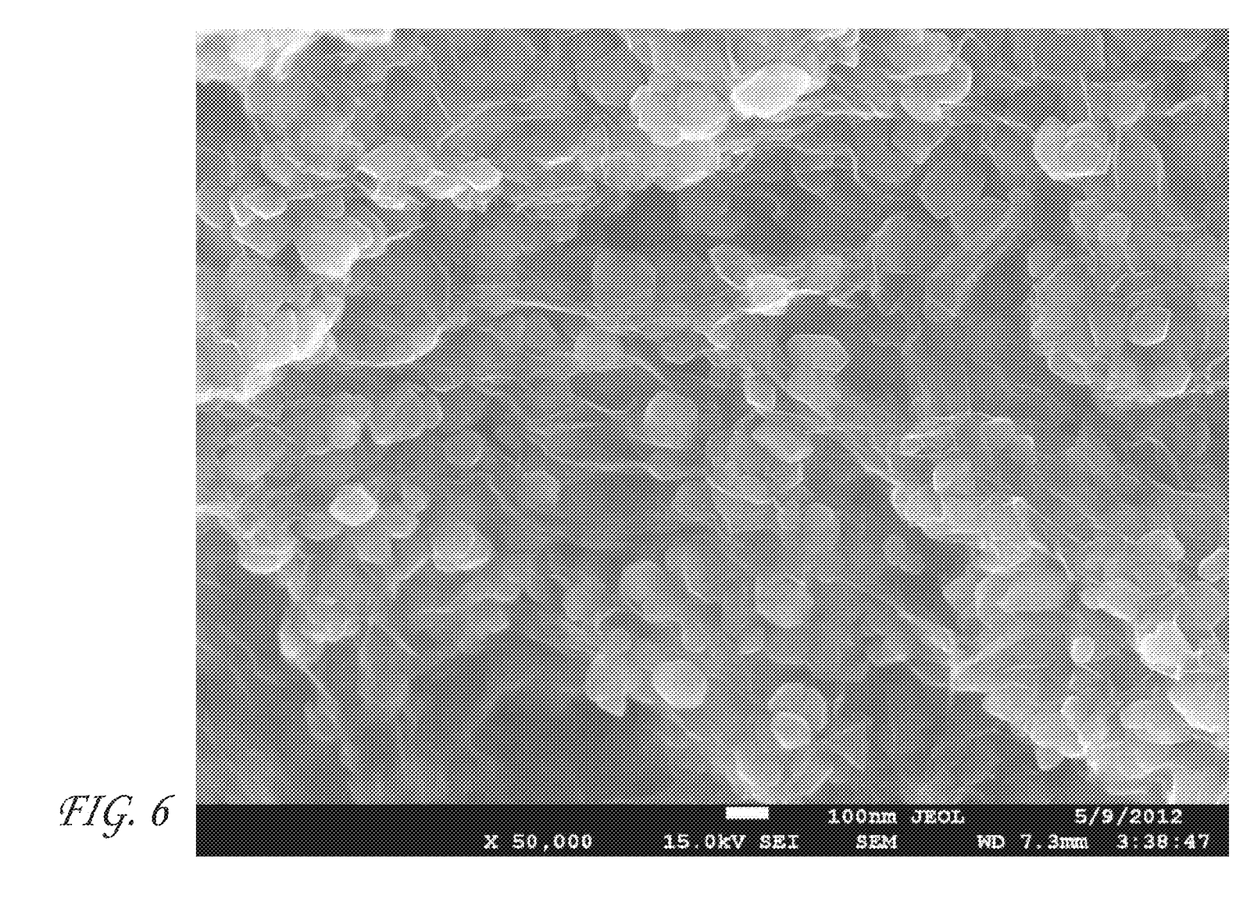
FIG. 6 shows a scanning electron microscopy image of the ZnO-graphene composite prepared according to Example 2.

The process in Example 1 was repeated except that the solvent includes approximately equal parts by volume of water and ethanol. The resulting ZnO-graphene composite was analyzed by XRD and SEM using the same procedure described in Example 1. The XRD pattern is shown in FIG. 5 and an SEM image shown in FIG. 6. These results demonstrate that ethanol may also be used as the solvent in the process of making the ZnO-graphene composite.

Example 3

Figure 7:
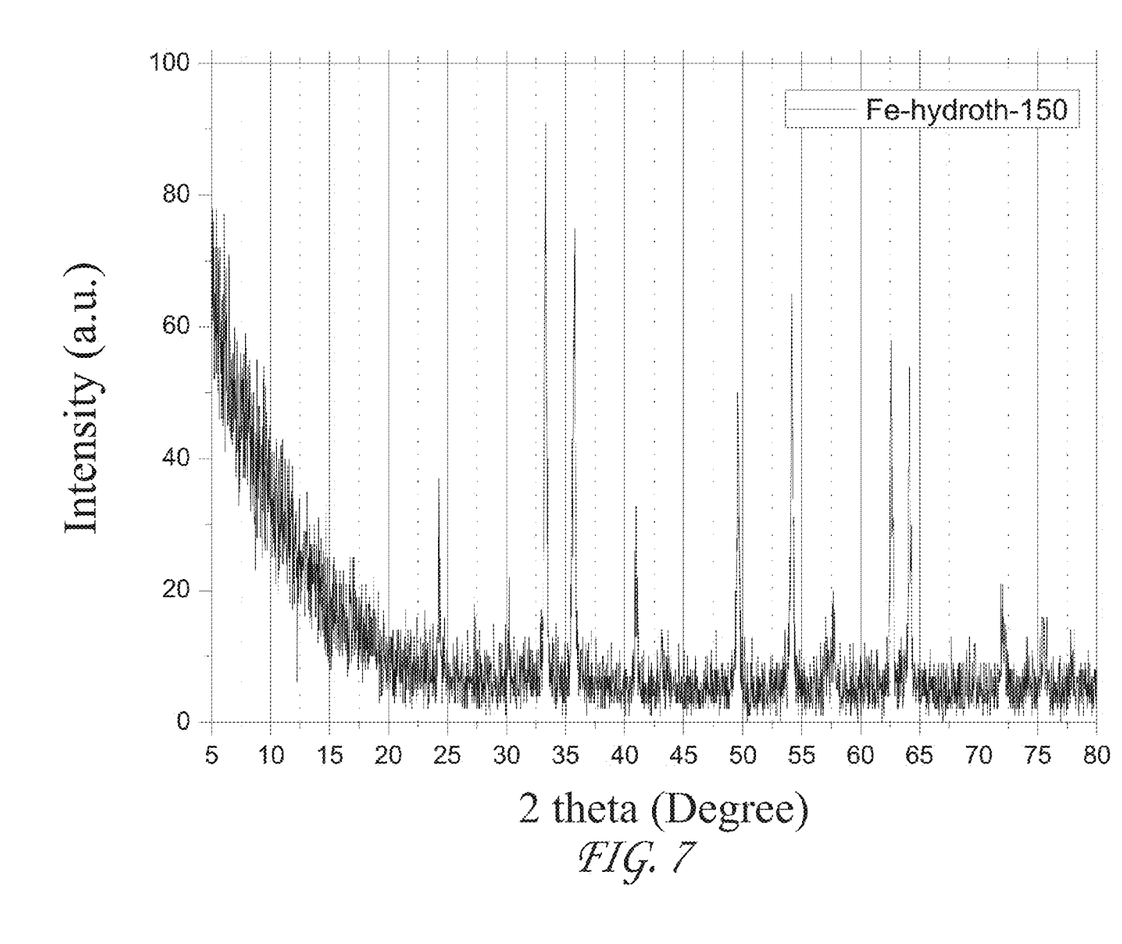
FIG. 7 shows an X-ray diffraction pattern obtained for the $Fe_2O_3$-graphene composite prepared according to Example 3.
Figure 8:
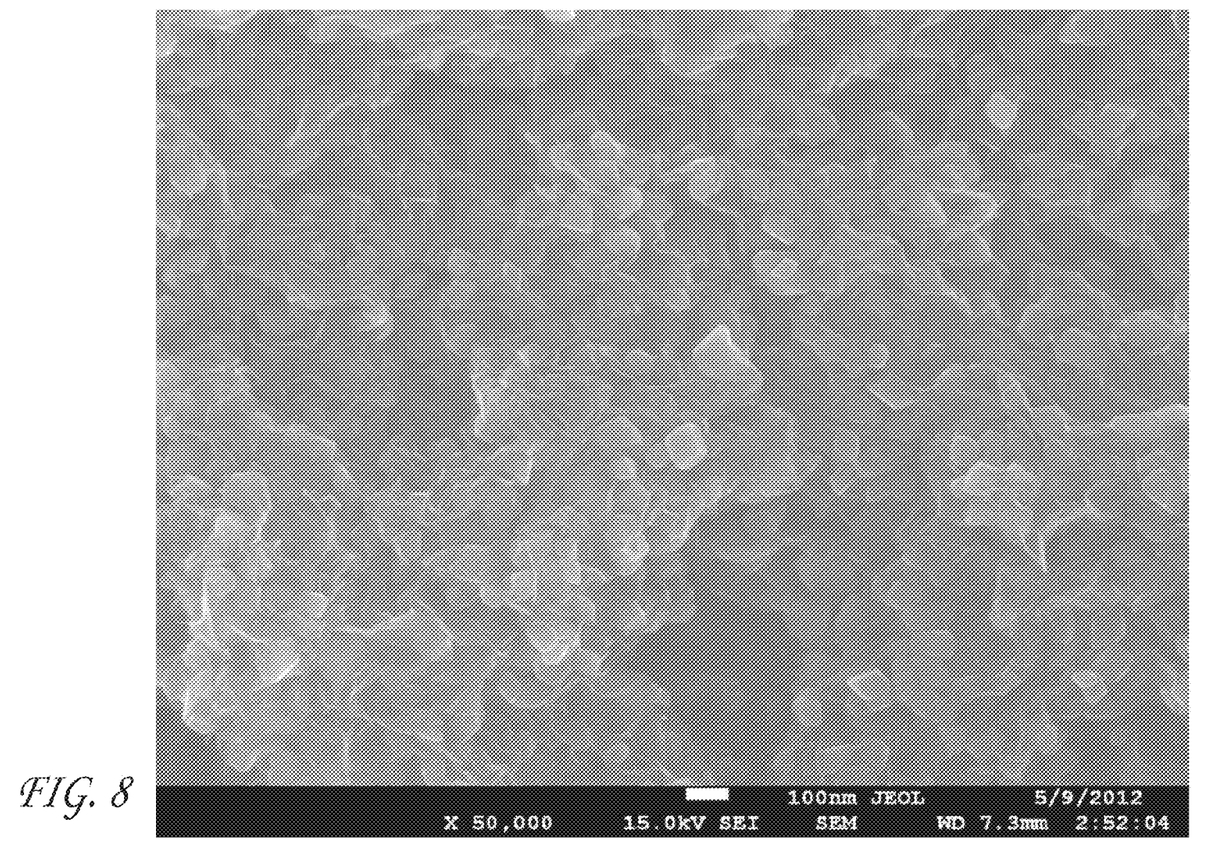
FIG. 8 shows a scanning electron microscopy image of the $Fe_2O_3$-graphene composite prepared according to Example 3.

The process in Example 1 was repeated except that 56 mg of iron powder was used rather than zinc powder to form a $Fe_2O_3$-graphene composite. The XRD pattern is shown in FIG. 7 and an SEM image shown in FIG. 8. These results demonstrate that the process can also be used to form composites having iron oxide.

Example 4

Figure 9:
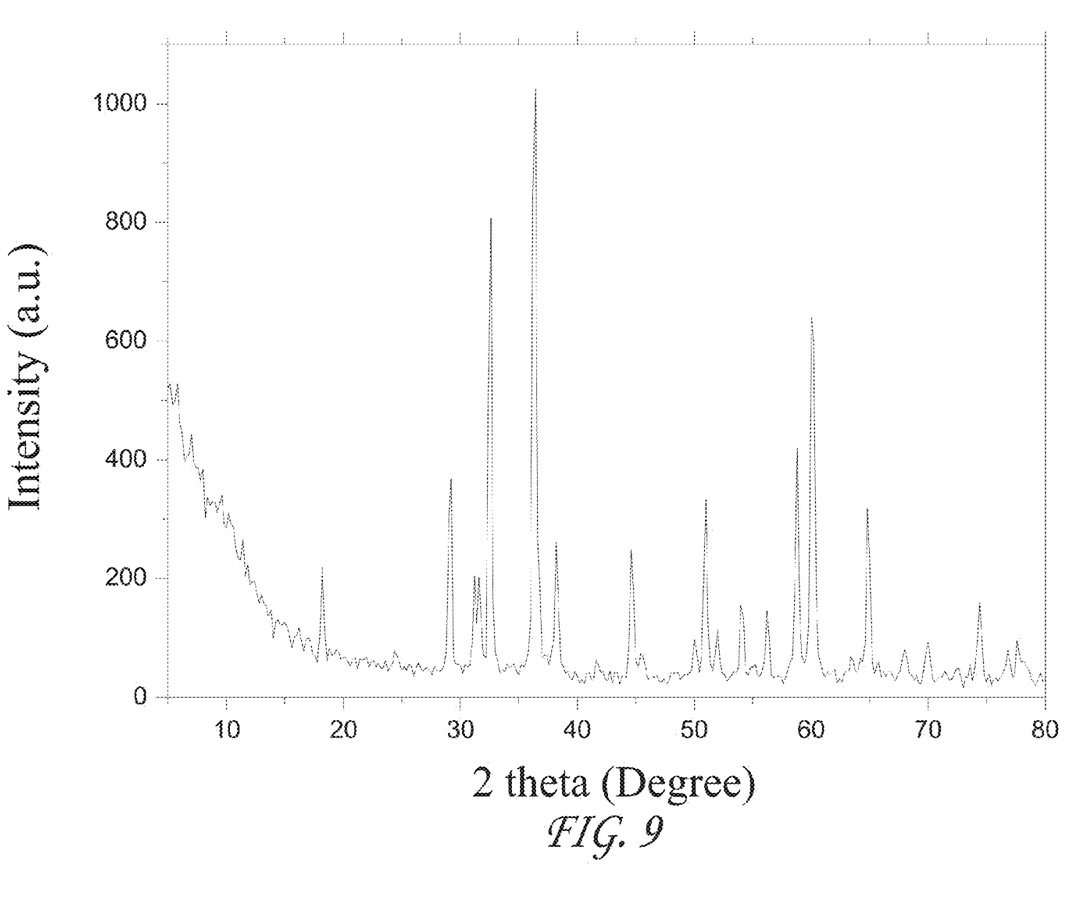
FIG. 9 shows an X-ray diffraction pattern obtained for the $Mn_3O_4$-graphene composite prepared according to Example 4.
Figure 10:
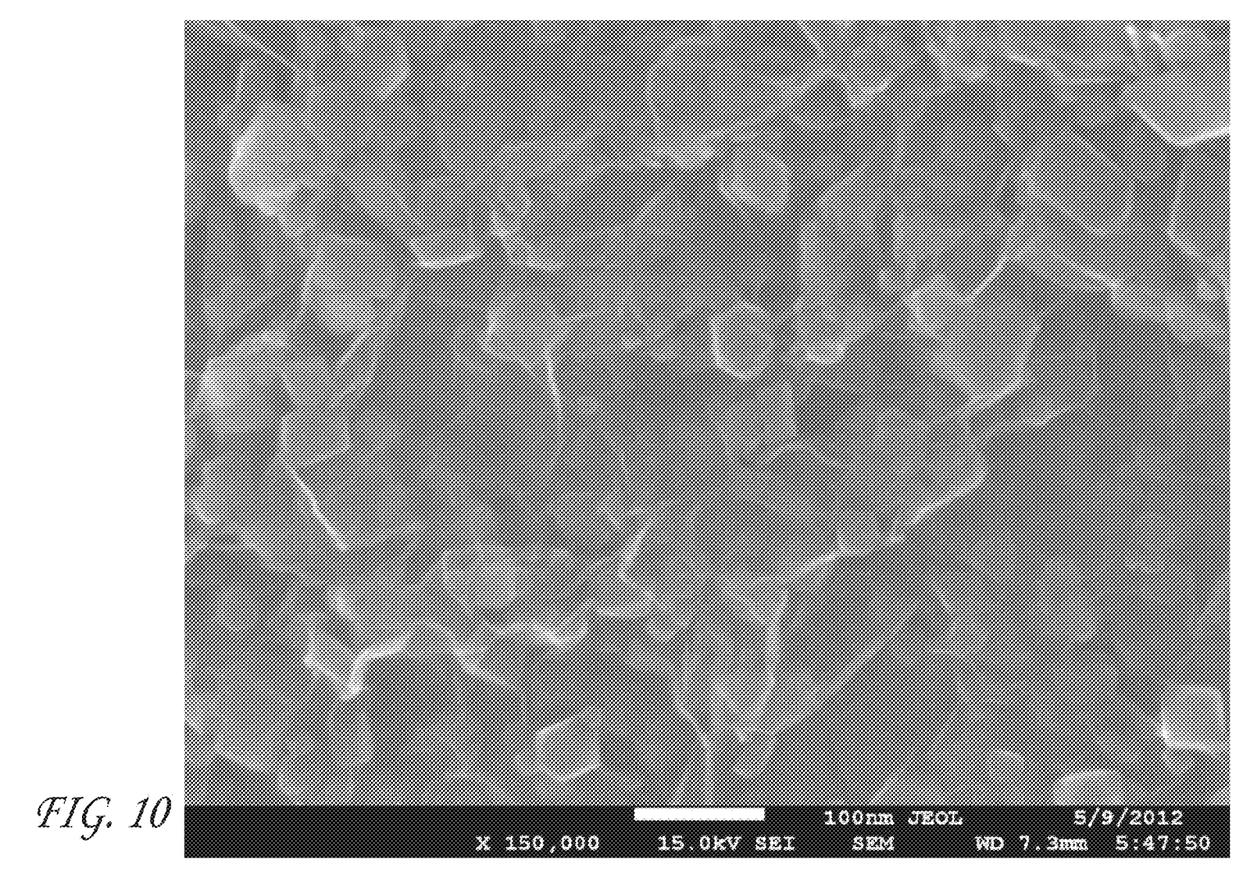
FIG. 10 shows a scanning electron microscopy image of the $Mn_3O_4$-graphene composite prepared according to Example 4.

The process in Example 1 was repeated except that 55 mg of manganese powder was used rather than zinc powder to form a $Mn_3O_4$-graphene composite. The XRD pattern is shown in FIG. 9 and an SEM image shown in FIG. 10. These results demonstrate that the process can also be used to form composites having manganese oxide.

Example 5

The process in Example 1 was repeated except that 58.7 mg of nickel powder was used rather than zinc powder to form a NiO-graphene composite.

What is claimed is:

1. A method of making a metal oxide-graphene composite, the method comprising:
   providing a composition comprising graphene oxide and at least one elemental metal dispersed in a liquid medium; and
   heating the composition in a sealed chamber at a temperature above a nominal boiling point of the liquid medium to form the metal oxide-graphene composite.

2. The method of claim 1, wherein the elemental metal comprises one or more of Ni, Mn, Fe, Zn, Sn, Cu, or Co.

3. The method of claim 1, wherein the composition comprises at least about 0.01 mg/mL of the elemental metal.

4. The method of claim 1, wherein the elemental metal is in a granular form.

5. The method of claim 4, wherein the elemental metal has an average particle size of less than or equal to about 100 µm.

6. The method of claim 1, wherein the composition comprises at least about 0.005 mg/mL of graphene oxide.

7. The method of claim 1, wherein the composition comprises at least about 1 part by weight of the elemental metal relative to 10 parts by weight of the graphene oxide.

8. The method of claim 1, wherein the composition comprises at least about 1 part by weight of the graphene oxide relative to 10 parts by weight of the elemental metal.

9. The method of claim 1, wherein the liquid medium comprises a protic solvent.

10. The method of claim 1, wherein the liquid medium comprises one or more of water or an organic solvent.

11. The method of claim 1, wherein the liquid medium comprises $C_{1-8}$ alkanol.

12. The method of claim 1, wherein the heating step is performed at a temperature of at least about 100° C.

13. The method of claim 1, wherein the heating step is performed for at least about 30 minutes.

14. The method of claim 1, further comprising isolating the metal oxide-graphene composite from the liquid medium.

15. The method of claim 14, wherein the isolating step comprises one or more of filtration, centrifugation, or sedimentation.

16. The method of claim 1, wherein the metal oxide-graphene composite comprises a crystalline or semi-crystalline metal oxide.

17. The method of claim 1, wherein the metal oxide-graphene composite comprises at least about 1 part by weight of metal oxide relative to 10 parts by weight of graphene.

18. The method of claim 1, wherein the metal oxide-graphene composite comprises at least about 1 part by weight of graphene relative to 10 parts by weight of metal oxide.

19. The method of claim 1, wherein the composition comprises no more than about 0.1 mg/mL of metal salts.

20. The method of claim 19, wherein the composition is substantially free of a metal salt.

21. The method of claim 1, wherein the composition is substantially free of a reducing agent.

\* \* \* \* \*